(12) United States Patent
Kolze

(10) Patent No.: US 7,139,335 B2
(45) Date of Patent: Nov. 21, 2006

(54) OPTIMAL DECISION METRIC APPROXIMATION IN BIT-SOFT DECISIONS

(75) Inventor: Thomas J. Kolze, Phoenix, AZ (US)

(73) Assignee: Broadcom Corporation, Irvine, CA (US)

(*) Notice: Subject to any disclaimer, the term of this patent is extended or adjusted under 35 U.S.C. 154(b) by 749 days.

(21) Appl. No.: 10/109,978

(22) Filed: Mar. 30, 2002

(65) Prior Publication Data

US 2003/0185318 A1 Oct. 2, 2003

(51) Int. Cl.
H03D 1/00 (2006.01)
H04L 27/06 (2006.01)

(52) U.S. Cl. .................. 375/341; 375/316; 375/324

(58) Field of Classification Search ........... 375/341, 375/316, 324
See application file for complete search history.

(56) References Cited

U.S. PATENT DOCUMENTS

| 5,396,518 A * | 3/1995 | How ..................... 375/265 |
| 6,594,318 B1 * | 7/2003 | Sindhushayana ........... 375/262 |
| 2001/0008022 A1 * | 7/2001 | Kokuryo et al. ........... 714/786 |
| 2001/0029596 A1 * | 10/2001 | Kim et al. ................ 714/796 |
| 2003/0123582 A1 * | 7/2003 | Kim et al. ................ 375/347 |

OTHER PUBLICATIONS

Ayanoglu "Broadband Wireless Internet Forum presentation" Jun. 25, 2001 WCAI, pp. 1-15.*

Ayanoglu, "Broadband Wireless Internet Forum white paper:VOFDM Broadband Wireless Transmission and Its Advantages over single Carrier Modulation", BWIF Dec. 15, 2000, pp. 1-35.*

* cited by examiner

*Primary Examiner*—Temesghen Ghebretinsae
*Assistant Examiner*—Juan Alberto Torres
(74) *Attorney, Agent, or Firm*—Garlick Harrison & Markison; Shayne X. Short

(57) ABSTRACT

Optimal decision metric approximation in bit-soft decisions. The present invention provides for calculation of the decision metrics/branch metrics for determining whether an incoming analog signal should be transformed into a 1 or a 0 in the digital realm. In performing these decisions, there is some probability associated with the decision to map the incoming signal to a value of 1 or 0. These decisions made in extracting bits from a particular symbol are typically referred to as bit-soft decisions. In making these bit-soft decisions, decoders commonly use decision metrics/branch metrics as mentioned above. Whereas prior art approaches typically are very computationally intensive to calculate these values, the present invention provides for a much improved and simplified calculation of decision metrics/branch metrics that may be used in bit-soft decisions. The optimal metric approximation may be implemented using a few mathematical operations and simple comparison logic circuitry.

28 Claims, 11 Drawing Sheets

OPTIMAL DECISION METRIC APPROXIMATION IN BIT-SOFT DECISIONS

CROSS REFERENCE TO RELATED APPLICATIONS

1. U.S. Utility patent application Ser. No. 10/112,128, entitled "FREQUENCY DRIFT AND PHASE ERROR COMPENSATION IN A VOFDM RECEIVER," filed Mar. 30, 2002, pending.

2. U.S. Utility patent application Ser. No. 10/112,009, entitled "MODIFIED BRANCH METRICS FOR PROCESSING SOFT DECISIONS TO ACCOUNT FOR PHASE NOISE IMPACT ON CLUSTER VARIANCE," filed Mar. 30, 2002, pending.

3. U.S. Utility patent application Ser. No. 10/112,567, entitled "CHARACTERIZING CHANNEL RESPONSE IN A SINGLE UPSTREAM BURST USING REDUNDANT INFORMATION FROM TRAINING TONES," filed Mar. 30, 2002, pending.

4. U.S. Utility patent application Ser. No. 10/114,023, entitled "VOFDM RECEIVER CORRELATION MATRIX PROCESSING USING FACTORIZATION," filed Mar. 30, 2002, now U.S. Pat. No. 6,947,715, issued on Sep. 20, 2005.

BACKGROUND

1. Technical Field

The invention relates generally to communication systems; and, more particularly, it relates to system and method that are operable to perform an efficient approximately of decision metrics used in bit-soft decisions.

2. Related Art

Communication systems transmit digital data through imperfect communication channels. These symbols may undergo some undesirable corruption due to the imperfection of the communication channel. One effort to try to avoid such situations is focused on performing forward error correction (FEC) coding. However, there is typically some difficulty in extracting the information contained within these symbols after they have been undesirably altered within the communication channel. There exist some methods that seek to curb the effect that the communication channel has had on the data; one such method includes employing using Decision Feedback Equalizers (DFEs). However, even after the incoming signal has been equalized, the extraction of the data, that has undergone some alteration due to the channel effects, is still a probabilistic determination.

Many communication systems, particularly in a receiver, need to perform the analog to digital transformation of an incoming signal. In doing so, there is oftentimes an uncertainty in whether a sample of the incoming analog signal is properly transformed into a 1 or a 0 in the digital realm; for example, there is not a 100% certainty that an incoming signal is actually a 1 or actually a 0—there is some probability associated with the decision. In higher-level encoding/decoding systems, e.g., QPSK/4 QAM, 16 QAM, 64 QAM, 256 QAM, 1024 QAM etc., there are several bits per symbol that need to be transformed to either a 1 or a 0. In 16 QAM applications, a receiver extracts 4 bits of data from each symbol. In the QAM modulation scheme, each symbol includes an in-phase component and a quadrature component. For the 16 QAM modulation type, the decision block maps the in-phase and quadrature components contained in the symbol to a 16 QAM constellation and decides the values of the four bits that are carried by the symbol.

The decisions made in extracting bits from a particular symbol are referred to as "bit-soft decisions." Bit-soft decisions not only map the symbol into bits but also produce a decision metric/branch metric related to the probability that the decision was correct based upon how well the symbol maps into the constellation. The terminology of "branch metric" is often used interchangeably with "decision metric," and this convention will be followed in this document. The decoder operates based on the premise that there are only a finite number of possible states of the encoder and that given a certain number of consecutive states, the input bit may be predicted that would have caused a particular state transition. The decoder generates a "branch metric" (or "decision metric") for each of the possible "state transitions" from one state to another. The coding method maintains a "decision metric" associated with every state which is the sum of the metric at its predecessor state and the metric associated with the branch that caused the state transition. This metric may be termed the cumulative metric, accumulated metric, or path metric, and the decoder generates the cumulative metric for all of the states. The different states and the transition from one state to another can be represented in a diagram, namely, a trellis diagram. For various possible allowable state transition sequences through the trellis (the allowable paths through the trellis), the decision metric associated with the sequence of branches of the trellis diagram are summed together, and the smallest sum is selected as the actual state transition and enables the identification of the best estimate of the decoded data. It is noted that with a sign change on each decision metric, the largest sum identifies the best path.

Prior art approaches to calculate decision metrics/branch metrics used in decoding systems typically are either very computationally intensive or deviate noticeably from the optimal metric. The computational intensiveness of the prior art approaches prohibits their implementation into many applications, particularly those that have relatively tight real estate and power consumption budgets. Again, these branch metrics are used to determine whether the mapping of a sample should be to that of a value of 1 or a value of 0. Many higher order coding schemes employ mapping of symbols into a constellation. In such situations, the various bits contained in the symbol, e.g., least significant bit (LSB), . . . most significant bit (MSB), etc. may be considered separately. For example, in the 16 QAM scheme, the in-phase component carries two bits while the quadrature phase component carries two bits. By considering separately each of the bits of the in-phase and quadrature components, the decision metrics may be employed in deciding whether the particular bit is a 1 or a 0, in making these bit-soft decisions.

One prior art approach is to employ the maximum a priori (MAP) approach, in which a probability of the source symbol is computed, based on information relating to the received, distorted symbol sequence. The bit-soft decision output of the MAP approach is termed a log-likelihood ratio (LLR) that is the logarithmic ratio of the probability of receiving a 1 divided by the probability of receiving a 0; these probabilities of determining the receipt of either a 1 or a 0 are often performed using Bayes Rule to the problem to determine the probability to reach a certain encoder state after receipt of a certain number of symbols and the probability to get from one encoder state to another with the received symbol sequence.

This is where the branch metrics come in; the branch metrics may be viewed as being the probabilities of the transitions from one encoder state to another. The branch metrics are a function of the received symbols and the model of the channel over which the symbols have been communicated. To illustrate the complexity of the prior art approach to calculating the decision metrics/branch metrics (that often involves the calculation of the LLR), a 16 QAM example is illustrated as shown below. One rail, containing 2 bits and 4 levels, is examined. The received voltage on the rail is Vrec. The 4 possible transmit levels are: $constp_a$, $constp_b$, $constp_c$, and $constp_d$. In the following equations, the levels $constpt_a$ and $constpt_b$ correspond to an MSB value of 0, and the variables $constpt_c$ and $constpt_d$ correspond to an MSB value of 1. To begin with, the log-likelihood function of a simple constellation point is as follows:

$$-\ln(e^{-(Vrec-constpt_a)^2/2\sigma^2})$$

Then, the log-likelihood function for MSB=0 is as follows:

$$-\ln(e^{-(Vrec-constpt_a)^2/2\sigma^2}+e^{-(Vrec-constpt_b)^2/2\sigma^2})$$

A prior art method of calculating the log likelihood ratio of an optimal bit-soft decision (ODM) for the MSB is as shown below:

$$ODM=\{-\ln(e^{-(Vrec-constpt_a)^2/2\sigma^2}+e^{-(Vrec-constpt_b)^2/2\sigma^2})\}-\{-\ln(e^{-(Vrec-constpt_c)^2/2\sigma^2}+e^{-(Vrec-constpt_d)^2/2\sigma^2})\}$$

The ODM shown above, which is the LLR of the MSB bit-soft decision, is the optimal decision metric for 16 QAM, one rail, for the most significant bit (MSB). Clearly, the LLR may be taken as a logarithm of a ratio or a difference of logarithms; the difference is shown above. The implementation of such non-linear equations can be very complex. To calculate these decision metrics accurately using the above-described methods is typically very difficult (theoretically) and is even more difficult to apply. Therefore, these decision metrics are simply not employed in most communication systems.

Further limitations and disadvantages of conventional and traditional systems will become apparent to one of skill in the art through comparison of such systems with the invention as set forth in the remainder of the present application with reference to the drawings.

SUMMARY OF THE INVENTION

Various aspects of the invention can be found in a receiver that performs approximation of optimal decision metrics/branch metrics (DMs/BMs) that are employed in making bit-soft decisions. Any decoding applications that seek to calculate these metrics may benefit from the present invention. Whereas prior art approaches have sought to implement very complex calculations that are typically very computationally intensive, the present invention is able to provide very accurate approximations using a greatly simplified approach. This new approach may be implemented using a very modest amount of mathematical and comparison logic circuitry. The savings in the receiver, in terms of real estate and power consumption, in addition to the increased performance provided by the very close approximation provided by the present invention, provide improvement over the prior art approaches. When it is considered that many prior art approaches do not even implement the computationally intensive equations of the log likelihood function of an optimal bit-soft decision (ODM), but rather utilize a greatly different bit soft decision than the LLR, the present invention can provide significant improvement in performance.

The present invention offers a solution that is also scalable to accommodate coding schemes of varying levels, including QPSK/4 QAM, 16 QAM, 64 QAM, 256 QAM and 1024 QAM, among others. The present invention may be implemented within a wireless communication system that employs the vector orthogonal frequency division multiplexing (VOFDM) portion of the broadband wireless Internet forum (BWIF) standard set. The optimal decision metric/branch metric approximation may be implemented within a wireless modem (WM) receiver within the wireless communication system architecture.

The present invention, in performing the approximation of the prior art's very computationally intensive equations used to generate branch metrics, the may be viewed as partitioning the in phase (I) and quadrature (Q) rails of the square symmetric constellation into various regions, each of which is approximated using linear equations. Across the entirety of the constellation, the various regions are approximated with individual segments that corporately make up a piecewise linear curve that spans the various axes of the constellation. For example, depending on the received voltage for a symbol and depending on the particular bit within the symbol (e.g., MSB, . . . 2SB, LSB), the mapping of the bit will be performed differently using the appropiate segment of the piecewise liner curve. The present invention provides a more efficient method of determining these bit-soft decisions compared to the prior art, in that, an optimal decision metric may be approximated using the appropriate segment of the piecewise linear curve for the various bits.

The above-referenced description of the summary of the invention captures some, but not all, of the various aspects of the present invention. The claims are directed to some other of the various other embodiments of the subject matter towards which the present invention is directed. In addition, other aspects, advantages and novel features of the invention will become apparent from the following detailed description of the invention when considered in conjunction with the accompanying drawings.

BRIEF DESCRIPTION OF THE DRAWINGS

A better understanding of the invention can be obtained when the following detailed description of various exemplary embodiments is considered in conjunction with the following drawings.

DETAILED DESCRIPTION OF THE INVENTION

The present invention is operable to perform an approximation of the complicated decision metrics/branch metrics that may be used to perform bit-soft decisions when decoding a received data stream. The prior art complicated optimal decision metrics are tightly approximated via linear solutions. The linear solutions employed in the optimal decision metric approximations closely track the more complicated optimal decision metrics without the significant complexities associated within the prior art implementations of calculating the decision metrics.

From certain perspectives, differing slopes are applied as scalar multiples to differences generated from the in-phase (I) and quadrature (Q) components of the incoming symbols. Depending upon the value of the I and Q components with symbol, and depending upon which of the bits (LSB, . . . , and MSB) within the symbol that the decision metric is being computed, these differences will be multiplied by differing scalar values. By applying these varying scalar gains to the raw values of the components of the incoming symbol, the approximated optimal solution to the decision metrics are closely approximated without the complexities associated with the prior art methods of calculating the decision metrics. In one embodiment, only addition or subtraction and one multiplication are needed to generate the tight approximation to the decision metrics (not counting operations that may be required for combining the multiple signals received from multiple receive antenna inputs). In one embodiment of the invention, implementation of the varying scalar factor, together with the multiplication operation, can be replaced with a few addition operations and some simple comparison logic. The present invention may be implemented using significantly reduced logic circuitry when compared to prior art methods of implementation for generating branch metrics.

Figure 1:
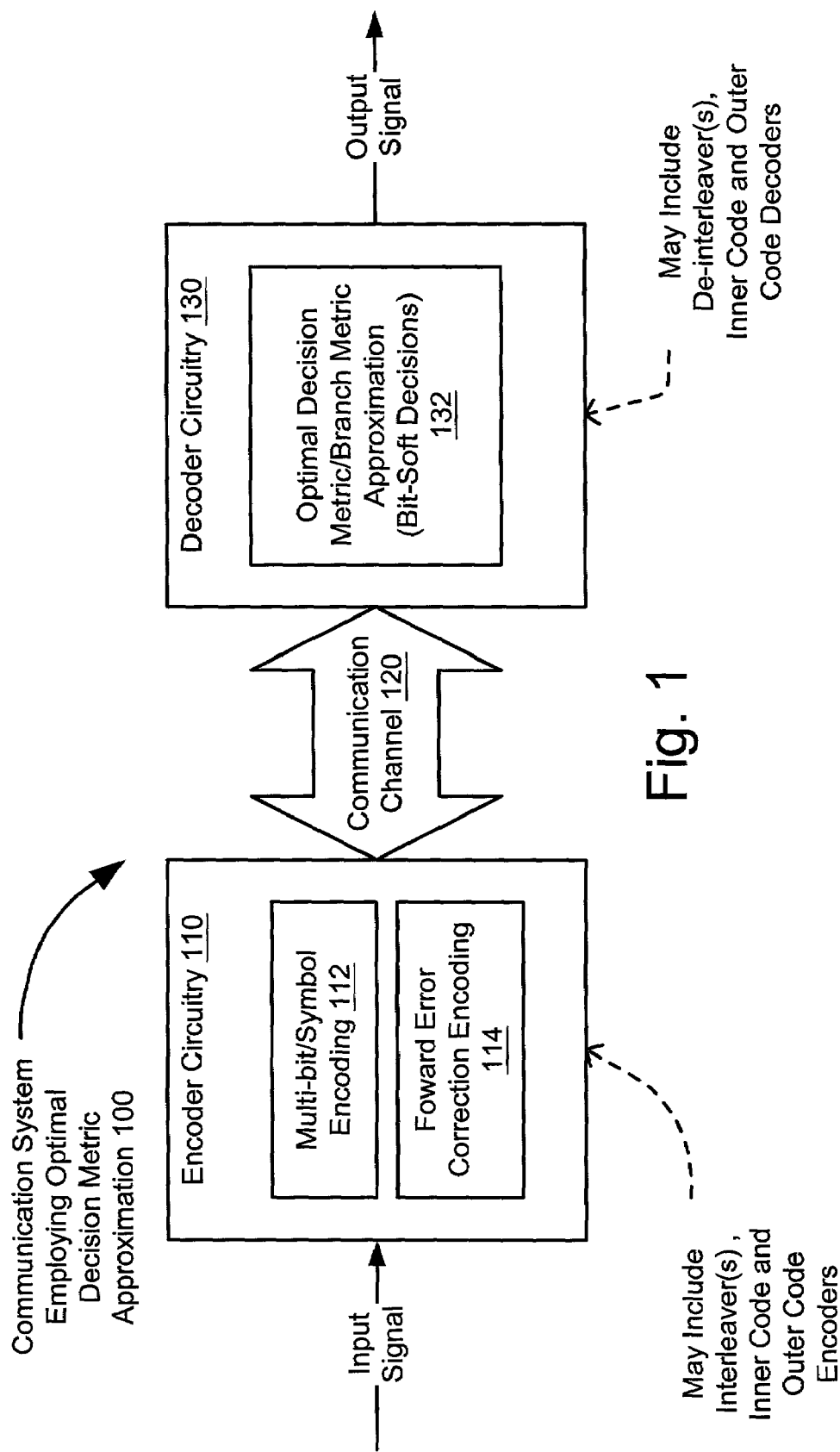
FIG. 1 is a system diagram illustrating an embodiment of a communication system employing optimal decision metric approximation according to the present invention.

FIG. 1 is a system diagram illustrating an embodiment of a communication system 100 employing optimal decision metric approximation according to the present invention. From one level, the present invention is operable within any communication system that needs to perform decision metrics/branch metrics in performing bit-soft decisions. In the FIG. 1, an input signal is provided to encoder circuitry 110 for transforming it into a form for communication via a communication channel 120 to a decoder circuitry 130. It is noted that the encoder circuitry 110 and the decoder circuitry 130 may include outer code encoders, inner code encoders, interleavers and inner code decoders, outer code decoders, de-interleavers, respectively.

The encoder circuitry 110 performs the encoding of symbols using multiple bits (multi-bit/symbol encoding 112) and some type of forward error correction (FEC) encoding 114. The decoder circuitry 130 performs optimal decision metric/branch metric approximation for use in making its bit-soft decisions, as shown in a block 132. The output signal, provided by the decoder circuitry 130, represents the best estimate of the input signal that is encoded by the encoder circuitry 110. The present invention is adaptable to provide for a vastly improved system and method for approximated decision metrics/branch metrics for use in bit-soft decisions within any communication system that employs multi-bit per symbol encoding and some form of forward error correction (FEC). In one implementation, the present invention is able to scale to square-symmetric QAM coding schemes of virtually any size, e.g., QPSK/4 QAM, 16 QAM, 64 QAM, 256 QAM, and 1024 QAM etc. Those persons having skill in the art will appreciate that the principles of efficiently approximating the decision metrics/branch metrics for use in bit-soft decisions may be extended to other types of coding schemes beyond those square-symmetric coding schemes.

The computationally intensive method of performing the calculations for the LLR, that is used to approximate the optimal decision metric, for performing bit-soft decisions may be simplified in accordance with the present invention. The exponents of the prior art equations may be multiplied by the metric of $2\sigma^2$; this key scaling makes the metric independent of the signal to noise ratio (SNR). For application to time-varying SNR channels, simple multiplicative scaling as a final metric produced via the approximation technique of the present invention will "factor back in" the SNR.

Then, for the 16 QAM embodiment, by dividing by the factor of 4, the metric may be made to agree with a distance metric. It is noted that the metric may be normalized without departing from the scope and spirit of the invention as well. The present invention provides for much more simplistic and improved calculations that enable a system to provide for optimal approximation to the decision metrics/branch metrics. As the decoder receives a voltage from across the communication channel, the received voltage is modified/approximated to enable proper decoding and signal processing of the received signal. Again, these metrics are scaled to match the distance metric close to the origin.

For the 16 QAM embodiment with Gray mapping with bits onto the symbols, the simplified equations, that may be implemented very straightforwardly using small amounts of mathematical and comparison logic, for approximating the branch metrics/decision metrics are shown below for both the most significant bit (MSB) and the least significant bit (LSB); the metrics are the same for both the in-phase (I) and quadrature (Q) components of the incoming symbols:

| MSB metric | = | $V_{rec} + (V_{rec} + 2)$ | for $V_{rec}$: $[-\infty, -2)$ |
|---|---|---|---|
| | = | $V_{rec}$ | for $V_{rec}$: $[-2, 2)$ |
| | = | $V_{rec} + (V_{rec} - 2)$ | for $V_{rec}$: $[2, \infty]$ |
| LSB metric | = | $2 - |V_{rec}|$ | for $V_{rec}$: $[-\infty, \infty]$ |

The present invention is also adaptable to the 64 QAM embodiment (another square symmetric constellation). These simplified equations may also be implemented very straightforwardly using small amounts of mathematical and comparison logic, for approximating the branch metrics/decision metrics. The decision metric of this invention as applied to Gray mapped 64 QAM is shown below for both the most significant bit (MSB), the $2^{nd}$ most significant bit (2 SB), and the least significant bit (LSB); again, the metrics are the same for both the in-phase (I) and quadrature (Q) components of the incoming symbols:

| | | | |
|---|---|---|---|
| MSB metric | = | $-(4 \cdot |V_{rec}| - 12)$ | for $V_{rec}$: $[-\infty, -6)$ |
| | = | $-(3 \cdot |V_{rec}| - 6)$ | for $V_{rec}$: $[-6, -4)$ |
| | = | $-(2 \cdot |V_{rec}| - 2)$ | for $V_{rec}$: $[-4, -2)$ |
| | = | $-|V_{rec}|$ | for $V_{rec}$: $[-2, 0)$ |
| | = | $V_{rec}$ | for $V_{rec}$: $[0, 2)$ |
| | = | $2 \cdot V_{rec} - 2$ | for $V_{rec}$: $[2, 4)$ |
| | = | $3 \cdot V_{rec} - 6$ | for $V_{rec}$: $[4, 6)$ |
| | = | $4 \cdot V_{rec} - 12$ | for $V_{rec}$: $[6, \infty]$ |
| 2SB metric | = | $-2 \cdot |V_{rec}| + 10$ | for $V_{rec}$: $[-\infty, -6)$ |
| | = | $-|V_{rec}| + 4$ | for $V_{rec}$: $[-6, -2)$ |
| | = | $-2 \cdot |V_{rec}| + 6$ | for $V_{rec}$: $[-2, 0)$ |
| | = | $-2 \cdot V_{rec} + 6$ | for $V_{rec}$: $[0, 2)$ |
| | = | $-V_{rec} + 4$ | for $V_{rec}$: $[2, 6)$ |
| | = | $-2 \cdot V_{rec} + 10$ | for $V_{rec}$: $[6, \infty]$ |
| LSB metric | = | $V_{rec} + 6$ | for $V_{rec}$: $[-\infty, -4)$ |
| | = | $-V_{rec} - 2$ | for $V_{rec}$: $[-4, 0)$ |
| | = | $V_{rec} - 2$ | for $V_{rec}$: $[0, 4)$ |
| | = | $V_{rec} + 6$ | for $V_{rec}$: $[4, \infty]$ |

These above-described equations are true for the specific coding embodiments of 16 QAM and 64 QAM, both of which are square symmetric constellations.

Figure 2:
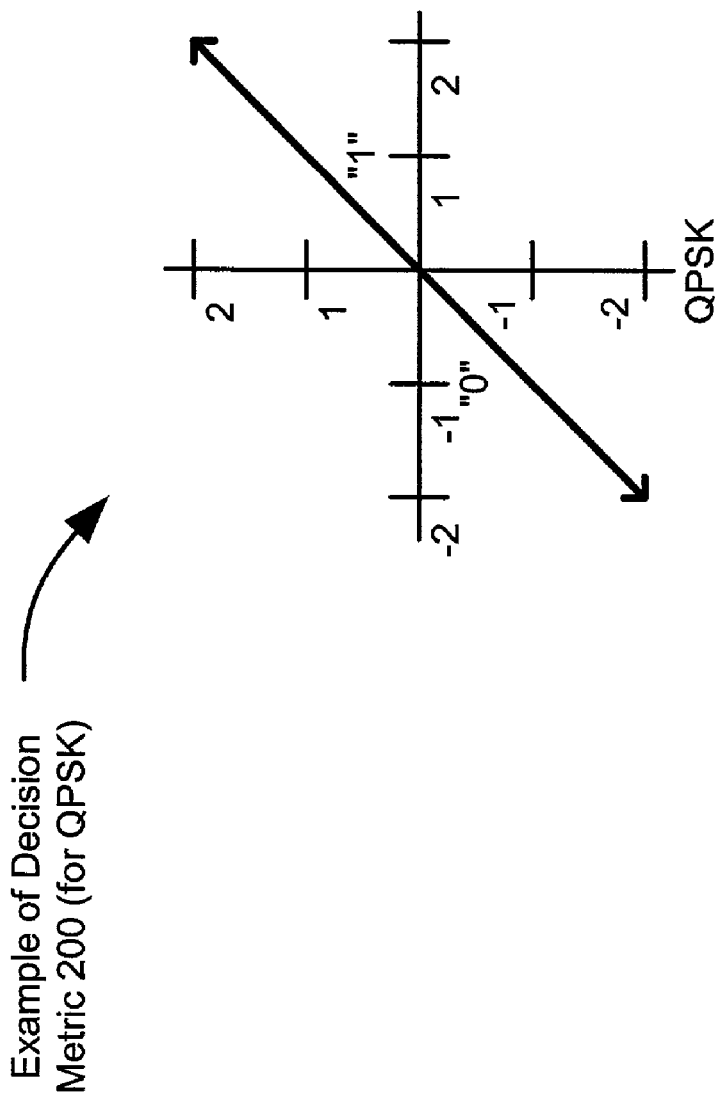
FIG. 2 is a diagram illustrating an example embodiment of a decision metric according to the present invention for QPSK.

FIG. 2 is a diagram illustrating an example embodiment 200 of a decision metric according to the present invention for QPSK. The FIG. 2 graphically depicts an optimal decision metric for one rail of QPSK and FIGS. 3–7 show the nearly optimal but very low complexity, decision metrics of this invention as applied to Gray mapped 16 QAM and 64 QAM. However, the present invention is readily adaptable and scalable to square symmetric constellations of any order, including 256 QAM, 1024 QAM, etc. Generally speaking, the present invention may be implemented within any constellations. The generic equations for the piece-wise linear approximation that is adaptable to calculate nearly optimal decision metrics to be used in bit-soft decisions are provided as follows:

In a general case, the bit assignment ("0" or "1") of the Nth bit is identified for each constellation point along the voltage axis of the I or Q rail. Half way between the 0 and 1 constellation voltages, the metric is 0, and continues to "run" up the voltage that is bit mapped to "1," and continues to "−1" at the voltage that is bit mapped to "0." At all voltages, identify the nearest constellation voltage with a 0 mapping, and the nearest constellation voltage with a 1 mapping. Let the voltage difference between these points be Vdiff=V1−V0. The slope of the metric of this invention is slope=Vdiff/2. By specifying the metric of this invention in at least one voltage, a mid-point of a "0" and "1" constellation voltage, and the slope at all voltages (except a finite number of voltages) mid-way between constellation points, and by specifying the metric to be continuous, the metric is fully and uniquely specified. The particular embodiments for square symmetric constellations have been described above. Those persons having skill in the art will appreciate that piece-wise linear approximation may be performed to assist in bit-soft decisions for other constellation types as well.

Figure 3:
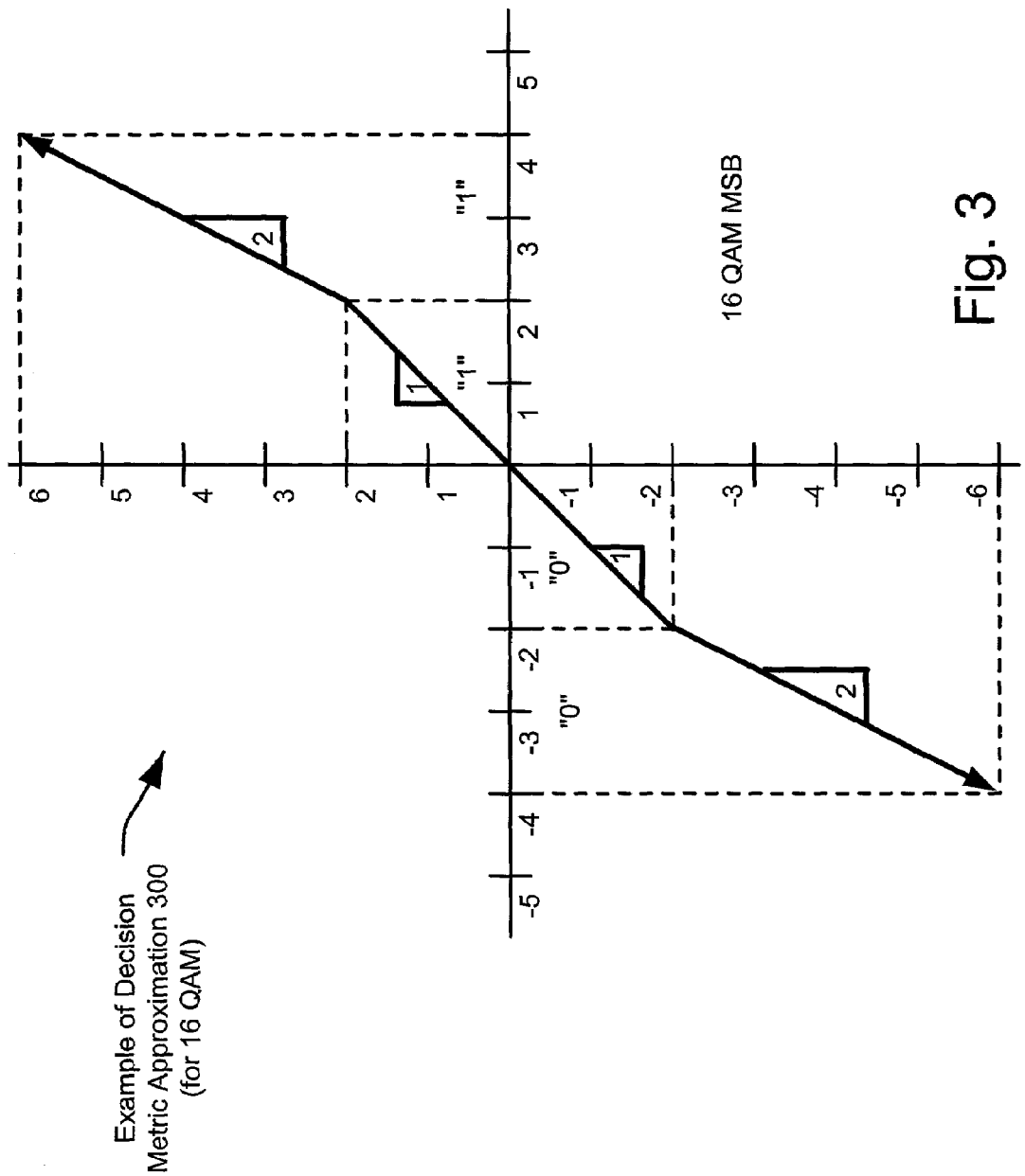
FIG. 3 is a diagram illustrating an example embodiment of decision metric approximation according to the present invention for the MSB of 16 QAM.
Figure 4:
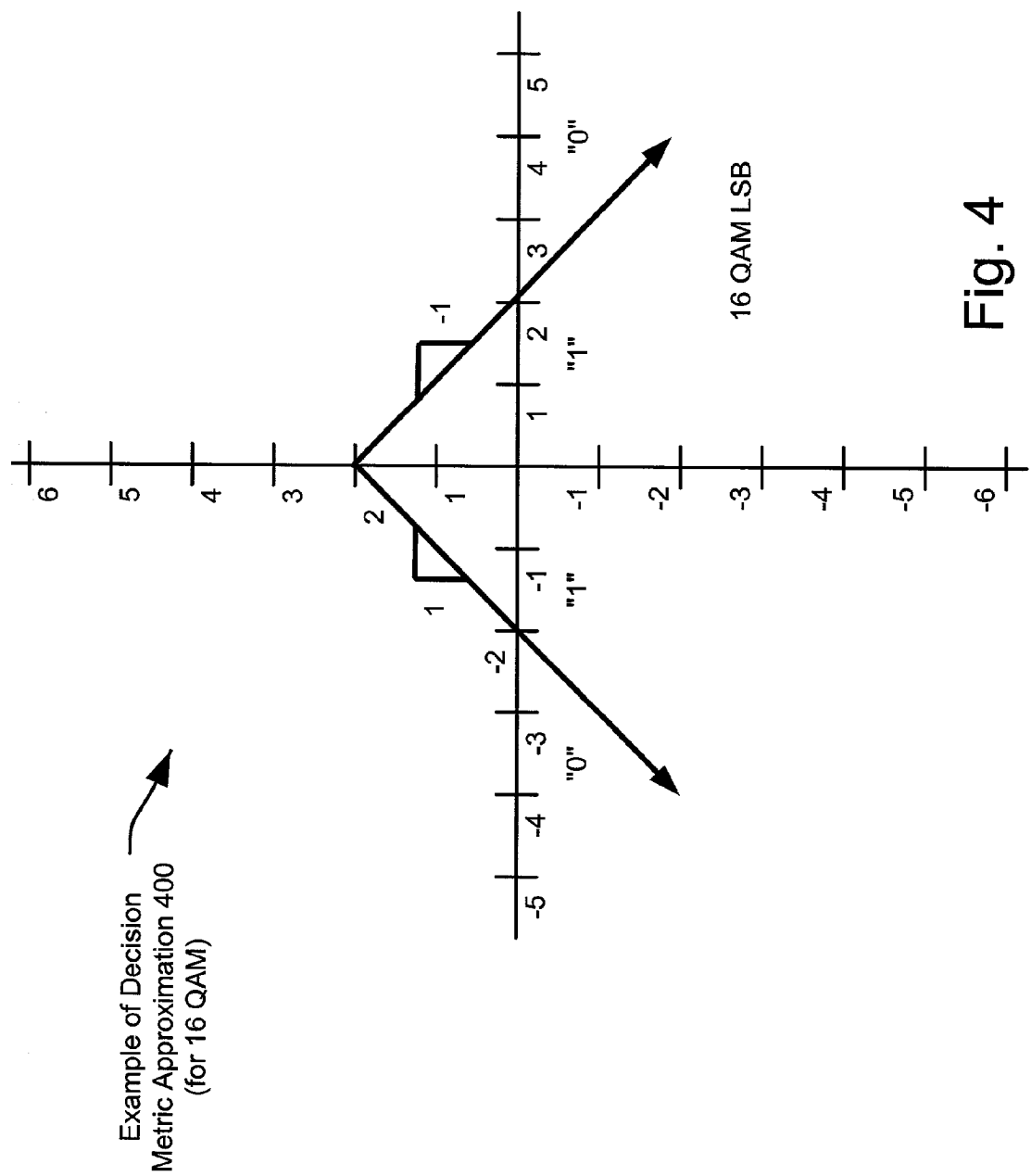
FIG. 4 is a diagram illustrating an example embodiment of decision metric approximation according to the present invention for the LSB of 16 QAM.
Figure 5:
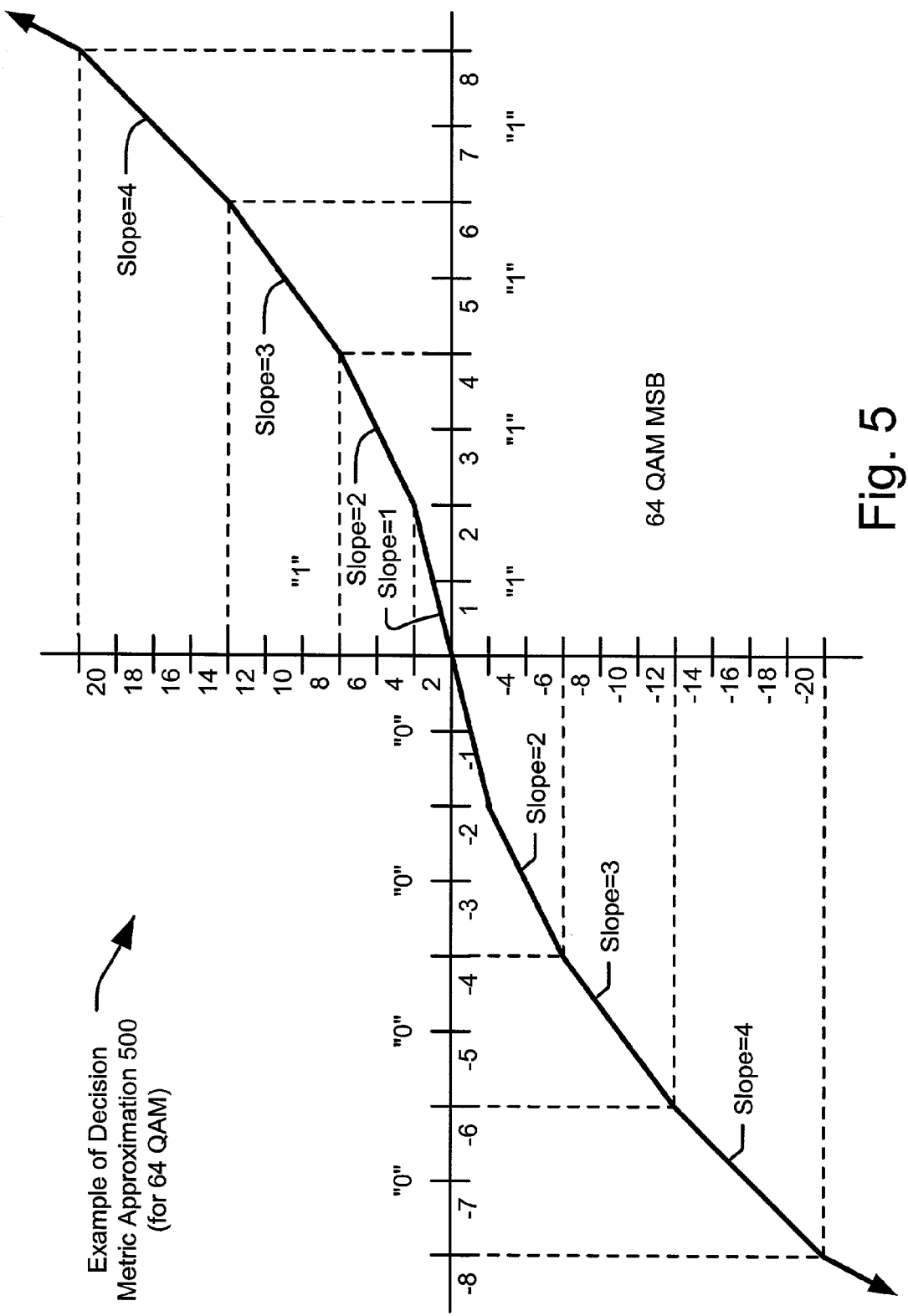
FIG. 5 is a diagram illustrating an example embodiment of decision metric approximation according to the present invention for the MSB of 64 QAM.
Figure 6:
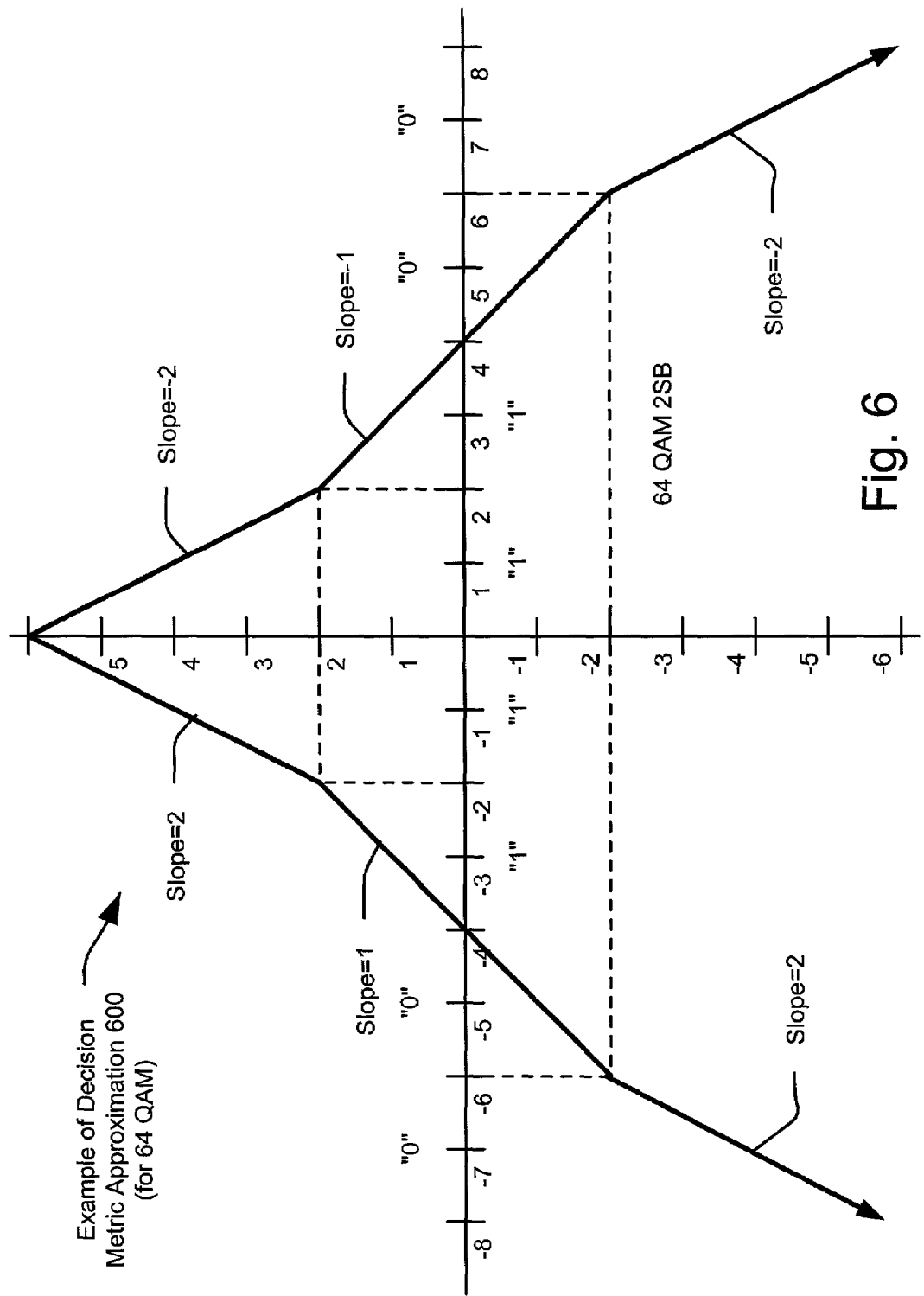
FIG. 6 is a diagram illustrating an example embodiment of decision metric approximation according to the present invention for the 2 SB of 64 QAM.
Figure 7:
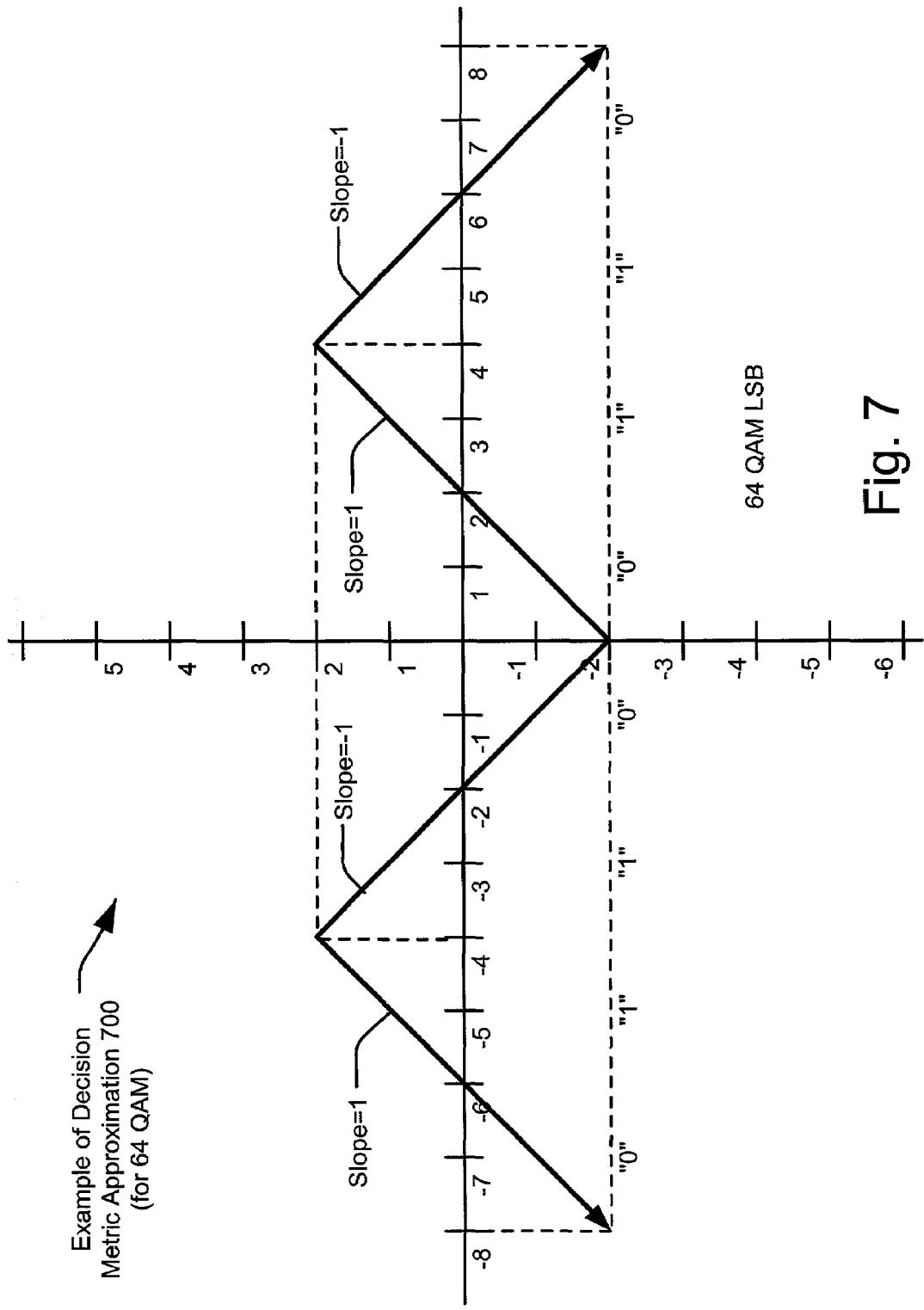
FIG. 7 is a diagram illustrating an example embodiment of decision metric approximation according to the present invention for the LSB of 64 QAM.

The FIGS. 3, 4, 5, 6, and 7 show other example embodiments 300, 400, 500, 600, and 700, respectively, of decision metric. The FIGS. 3, 4, 5, 6, and 7, shows other example embodiments of decision metric approximation according to the present invention. Specifically, FIG. 3 shows embodiment 300 for the MSB of 16 QAM, and FIG. 4 shows embodiment 400 for the LSB of 16 QAM. In addition, FIG. 5 shows embodiment 500 for the MSB of 64 QAM, 30 FIG. 6 shows embodiment 600 for the 2 SB of 64 QAM, and FIG. 7 shows embodiment 700 for the LSB of 64 QAM.

Figure 8:
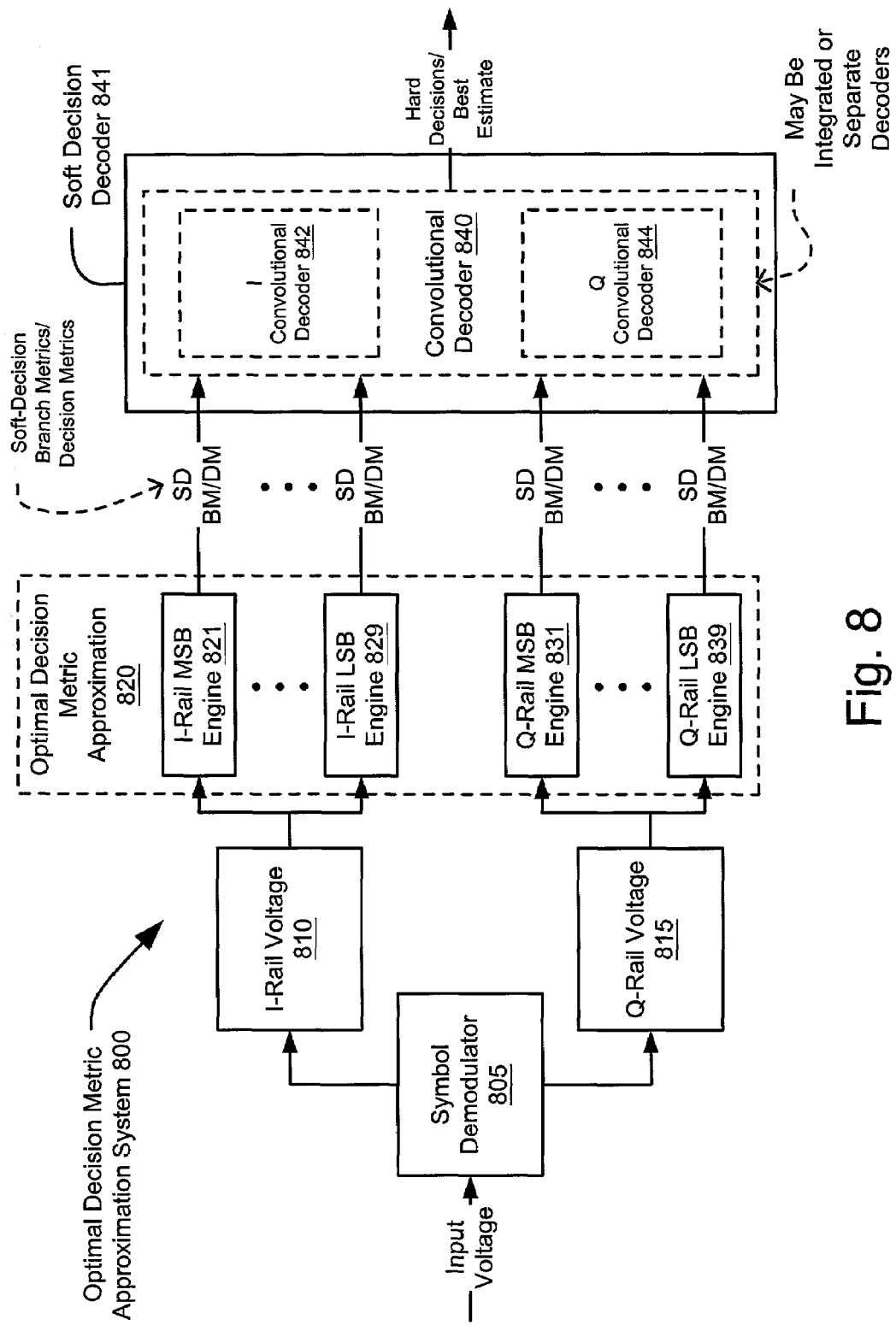
FIG. 8 is a system diagram illustrating an embodiment of an optimal decision metric approximation system that is built according to the present invention.

FIG. 8 is a system diagram illustrating an embodiment of an optimal decision metric approximation system 800 that is built according to the present invention. A received voltage (as shown by the input voltage) is input a symbol demodulator 805 of the optimal decision metric approximation system 800. The symbol demodulator 805 splits the input voltage into the in-phase (I) and quadrature (Q) components, e.g., the I-Rail and the Q-rail voltages, as shown by the functional blocks 810 and 815, respectively. Then, the optimal decision metric approximation system 800 performs optimal decision metric approximation, as shown in the functional block 820, to generate soft-decision branch metrics/decision metrics (SD DMs/BMs) that are all provided to a soft decision decoder 841 (that may be a convolutional decoder 840 in certain embodiments), from which the hard bit decisions/best estimate for the data carried via the input voltage that is provided to the symbol demodulator 805. The convolutional decoder 840 (being one embodiment type of the soft decision decoder 841) may be a Viterbi decoder in certain embodiments.

Within the optimal decision metric approximation 820, the I-rail and the Q-rail voltages are dealt with separately. For example, the I-rail voltages are provided to a number of engines to deal with each of the various I-rail voltage bits of the symbol. For example, an I-rail most significant bit (MSB) engine 821, as well as any intermediary I-rail bit engines . . . and an I-rail least significant bit (LSB) engine 829 generate the SD DM/BM for the I-rail MSB, . . . , and the I-rail LSB, respectively. Similarly, the Q-rail voltages are provided to a number of engines to deal with each of the various Q-rail voltage bits of the symbol. For example, a Q-rail most significant bit (MSB) engine 831, as well as any intermediary Q-rail bit engines . . . and a Q-rail least significant bit (LSB) engine 839 generate the SD DM/BM for the Q-rail MSB, . . . , and the Q-rail LSB, respectively. The present invention is operable to scale to a variety of symbol sizes, having differing number of bits, without departing from the scope and spirit of the invention.

Again, after the soft-decision branch metrics/decision metrics (SD DMs/BMs) have been calculated, using the efficient implementation as provided within the present invention, the soft decision decoder 841 generates the hard bit decisions/best estimate for the data. If desired, the soft decision decoder 841 may be broken down into two separate convolutional decoders (an I convolutional decoder 842 and a Q convolutional decoder 844), or the functionality may be performed within a single integrated soft decision decoder, e.g., soft decision decoder 841, and in certain specific embodiments, the convolutional decoder 840.

Figure 9:
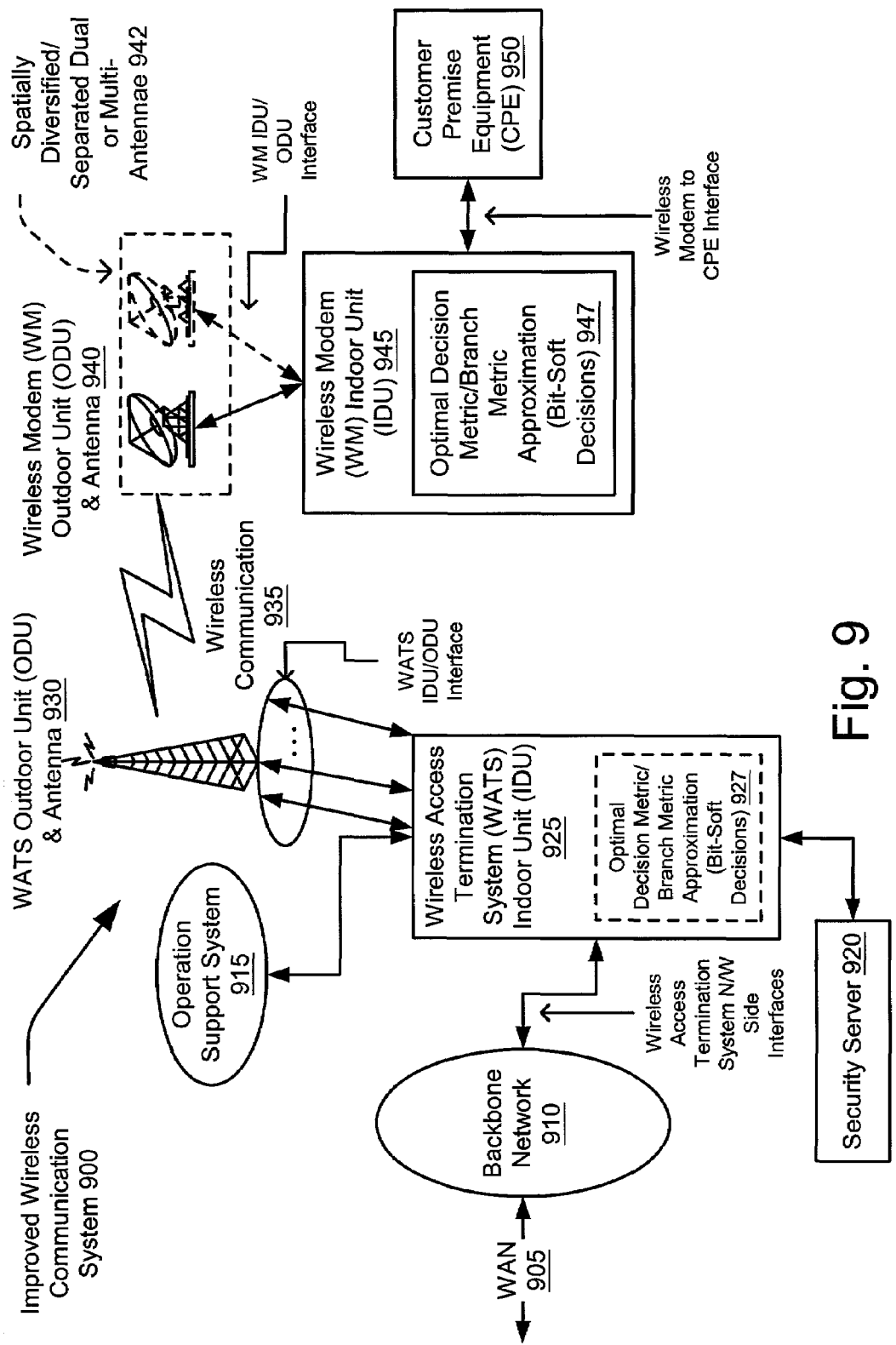
FIG. 9 is a system diagram illustrating an embodiment of an improved wireless communication system that is built according to the present invention.

FIG. 9 is a system diagram illustrating an embodiment of an improved wireless communication system 900 that is built according to the present invention. The present invention is operable within the improved wireless communication system 900 that employs the vector orthogonal frequency division multiplexing (VOFDM) portion of the broadband wireless Internet forum (BWIF) standard set. The VOFDM standard defines the physical layer and additional layers in which a plurality, e.g., up to 1,024 separate carriers (tones) carry either data (data tones) or training/pilot signals (training/pilot tones). The 1,024 tones are separated in frequency such that they are orthogonal to one another. The VOFDM standard also defines a multiple antennae receive path that combines the signal received via each of the antennae using a combining methodology. In the receiver of a VOFDM device (sometimes referred to as a wireless modem (WM) indoor unit (IDU)), a decision block maps incoming voltage signals corresponding to a particular symbol to a modulation constellation in order to extract bits carried by the symbol.

Here, the present invention is operable to provide for improved decoding of the received voltage signal that is provided to a wireless modem (WM) indoor unit (IDU) 945; optimal decision metric/branch metric approximation is performed for use in bit-soft decision (as shown in functional block 947) within the WM IDU 945. It is also noted that optimal decision metric/branch metric approximation may be performed for use in bit-soft decision (as shown in functional block 927) within the WATS IDU 925 without departing from the scope and spirit of the invention. One or both of the transmit directions may practice the present invention. The functionality offered by the present invention may be performed in both transmit/receive paths without departing from the scope and spirit of the invention.

The improved wireless communication system 900 may be viewed in light of the wireless communication system reference architecture of the BWIF; the present invention provides for improved signal processing within the WM IDU 945. A wide area network 905 communicatively couples to a backbone network 910. The backbone network 910 in turn communicatively couples to a wireless access termination system (WATS) indoor unit (IDU) 925. The WATS IDU 925 is serviced via operation system support 915 and a security server 920. The WATS IDU 925 is operable to communicate with a WATS outdoor unit (ODU) and antenna 930 using one or more signals. The present invention implements vector orthogonal frequency division multiplexing (VOFDM) where the signal is partitioned among a number of frequencies. The WATS ODU 930 communicates with a wireless modem (WM) outdoor unit (ODU) and antenna 940 via wireless communication 935. If desired, the WM ODU and antenna 940 is implemented in a spatially diversified/separated dual or multi-antennae implementation 942. The WM ODU and antenna 940 provides the one or more signals to the WM IDU 945 that is operable to optimal decision metric/branch metric approximation 947 in making bit-soft H decisions. The WM IDU 945 communicatively couples to a customer premises equipment (CPE) 950. The FIG. 9 shows just one embodiment where a communication system may benefit from the functionality offered by the present invention in optimally making bit-soft decisions.

It is noted that the functionality offered by the present invention may be performed in both transmit/receive paths without departing from the scope and spirit of the invention, as shown by the functionality within the functional blocks 947 and 927.

Figure 10:
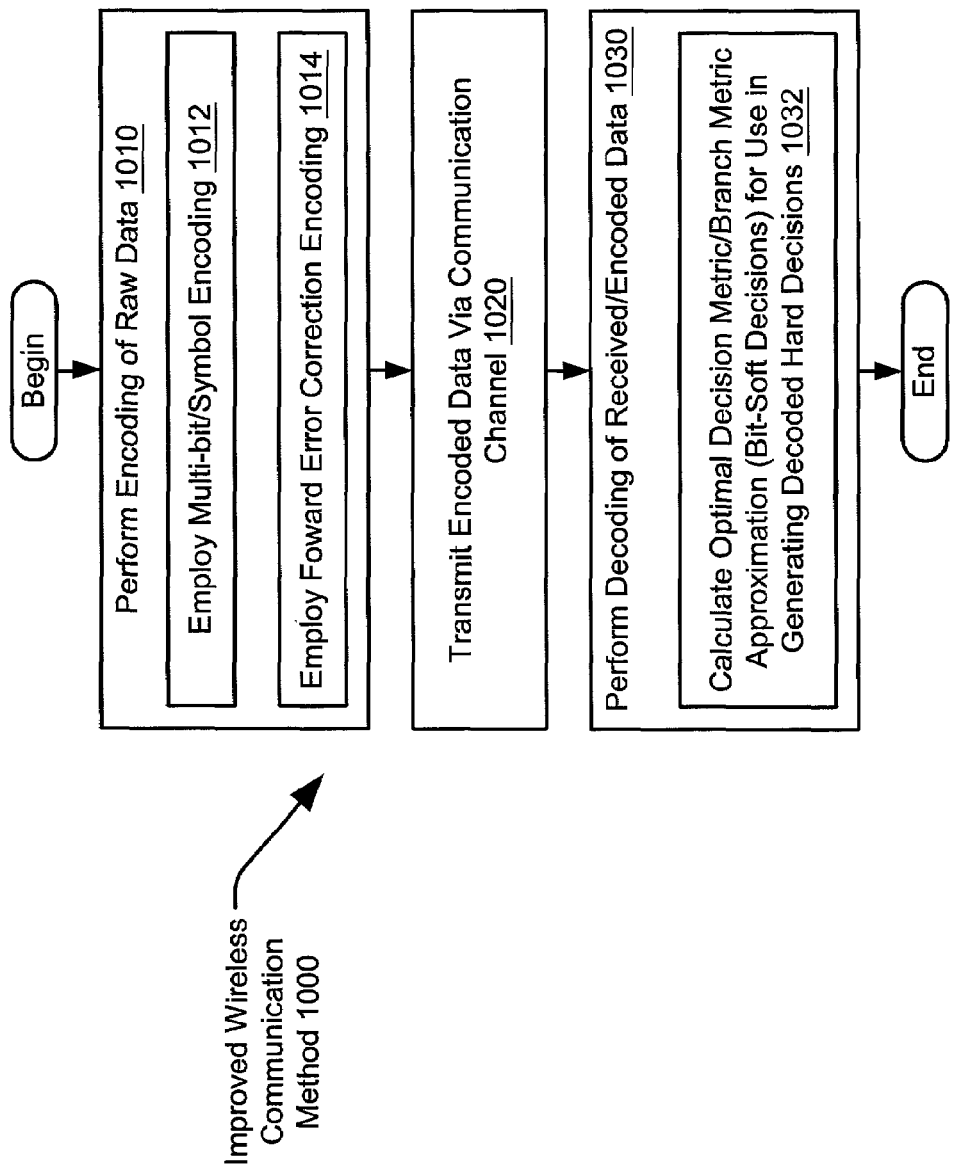
FIG. 10 is a functional block diagram illustrating an embodiment of an improved wireless communication method that is performed according to the present invention.

FIG. 10 is a functional block diagram illustrating an embodiment of an improved wireless communication method 1000 that is performed according to the present invention. In a block 1010, raw data are encoded. The encoding performed in the block 1010 is performed by employing multi-bit/symbol encoding 1012 and employing forward error correction (FEC) encoding 1014. After the encoding has been performed, then the encoded data is transmitted via a communication channel 1020. After the encoded data are received at the other end of the communication channel, then the received/encoded data are decoded in a block 1030. Within the decoding operations in a block 1032, optimal decision metrics/branch metrics approximation are calculated for use in soft bit decisions; these optimal decision metrics/branch metrics are passed to a decoder that generates the hard bit decisions/best estimate of the data.

Figure 11:
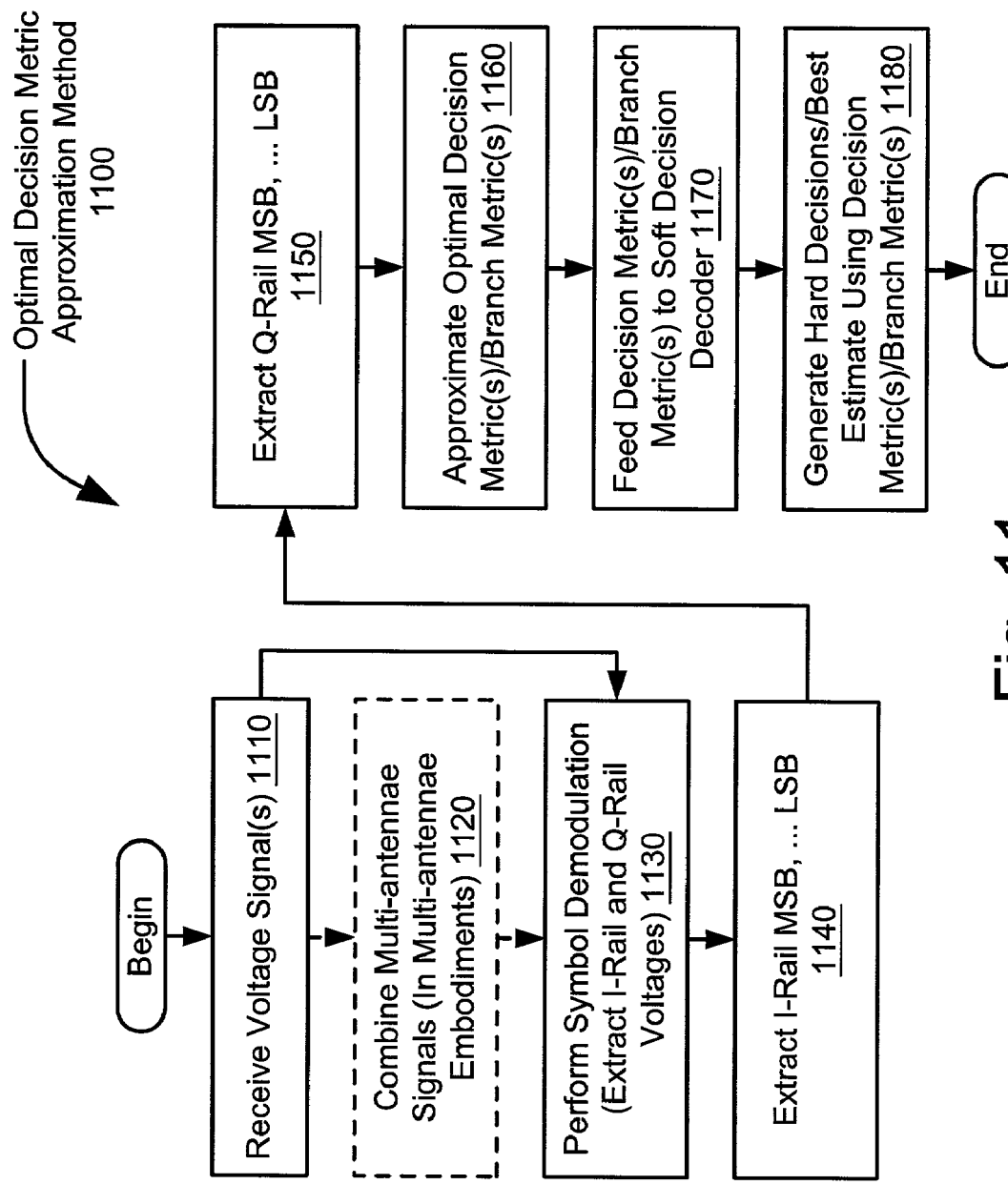
FIG. 11 is a functional block diagram illustrating an embodiment of an optimal decision metric approximation method that is performed according to the present invention.

FIG. 11 is a functional block diagram illustrating an embodiment of an optimal decision metric approximation method 1100 that is performed according to the present invention. In a block 1110, one or more voltage signal(s) is/are received. If the embodiment employs multiple antennae, then the multiple signals are combined in an optional block 1120. In a block 1130, the received voltage is demodulated whereby the I-rail and Q-rail voltages are extracted. In a block 1140, the I-rail bits for the symbol are extracted, including any most significant bit (MSB), . . . , and any least significant bit (LSB). Then, in a block 1150, the Q-rail bits for the symbol are extracted, including any most significant bit (MSB), . . . , and any least significant bit (LSB). Then, in a block 1160, optimal decision metrics/branch metrics are approximated in accordance with the present invention. In a block 1170, these approximated optimal decision metrics/branch metrics are fed to a soft decision decoder. Then, in a block 1180, the hard decisions/best estimate of the data are made using the optimal decision metrics/branch metrics that were approximated in the block 1170.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. An apparatus, comprising:
   a symbol demodulator that is operable to:
      receive an input voltage signal that has extracted from a data signal that has been generated using multi-bit per symbol encoding and forward error correction encoding;
      extract an I-rail voltage (In-phase voltage) and a Q-rail voltage (Quadrature-phase voltage) from the input voltage signal;
   an I-rail MSB (Most Significant Bit) engine that is operable to process the I-rail voltage to approximate a first optimal decision metric using a first piece-wise linear metric function;
   an I-rail LSB (Least Significant Bit) engine that is operable to process the I-rail voltage to approximate a second optimal decision metric using a second piece-wise linear metric function;
   a Q-rail MSB engine that is operable to process the Q-rail voltage to approximate a third optimal decision metric using the first piece-wise linear metric function;
   a Q-rail LSB engine that is operable to process the Q-rail voltage to approximate a fourth optimal decision metric using the second piece-wise linear metric function;
   an I convolutional decoder that is operable to process the first optimal decision metric and the second optimal decision metric thereby generating a best estimate of at least a first bit of a symbol that has been encoded into a received data signal; and
   a Q convolutional decoder that is operable to process the third optimal decision metric and the fourth optimal decision metric thereby generating a best estimate of at least a second bit of the symbol that has been encoded into the received data signal.

2. The apparatus of claim 1, wherein the apparatus is a wireless modem indoor unit.

3. The apparatus of claim 1, wherein the approximated optimal decision metric substantially comprises a distance metric.

4. The apparatus of claim 1, wherein:
the symbol that has been encoded into the received data signal is a 64 QAM symbol;
the first piece-wise linear metric function is a monotonically increasing, odd function that includes seven segments such that each of the seven segments has one of four possible slope values; and
the second piece-wise linear metric function is an even function that includes four segments such that each of the four segments has one of two possible slopes values.

5. The apparatus of claim 1, wherein the I convolutional decoder and the Q convolutional decoder are implemented within a convolutional decoder that is operable to combine the best estimate of the at least a first bit of the symbol and the best estimate of the at least a second bit of the symbol thereby generating a best estimate of the symbol.

6. The apparatus of claim 1, wherein the apparatus is employed within a communication system that employs vector orthogonal frequency division multiplexing.

7. The apparatus of claim 1, further comprising a plurality of antennae that is configured in a spatially diversified manner; and wherein:
each antenna within the plurality of antennae provides an antenna signal; and
the apparatus combines each of the antenna signals into a single communication receiver signal before approximating the optimal decision metric.

8. The apparatus of claim 1, wherein the apparatus is employed within a communication system that employs at least one of a QPSK coding scheme, a 16 QAM coding scheme, a 64 QAM coding scheme, a 256 QAM coding scheme, and a 1024 QAM coding scheme.

9. An apparatus, comprising:
a symbol demodulator that receives an input voltage and splits the input voltage into an I-rail voltage and a Q-rail voltage;
a plurality of I-rail engines that receives the I-rail voltage, one of the I-rail engines generates a soft-decision metric for a most significant I-rail bit using a first piece-wise linear metric function and at least one additional of the I-rail engines generates a soft-decision metric for a least significant I-rail bit using a second piece-wise linear metric function;
a plurality of Q-rail engines that receives the Q-rail voltage, one of the Q-rail engines generates a soft-decision metric for a most significant Q-rail bit using the first piece-wise linear metric function and at least one additional of the Q-rail engines generates a soft-decision metric for a least significant Q-rail bit using the second piece-wise linear metric function;
an I convolutional decoder that is operable to process the soft-decision metric for the most significant I-rail bit and the soft-decision metric for the least significant I-rail bit thereby generating a best estimate of at least a first bit of a symbol that has been encoded into a received vector orthogonal frequency division multiplexing (VOFDM) signal; and
a Q convolutional decoder that is operable to process the soft-decision metric for the most significant Q-rail bit and the soft-decision metric for the least significant Q-rail bit thereby generating a best estimate of at least a second bit of the symbol that has been encoded into the received VOFDM signal.

10. The apparatus of claim 9, wherein the apparatus is a wireless modem.

11. The apparatus of claim 9, wherein the data encoded within the input voltage are encoded using at least one of a QPSK coding scheme, a 16 QAM coding scheme, a 64 QAM coding scheme, a 256 QAM coding scheme, and a 1024 QAM coding scheme.

12. The apparatus of claim 9, wherein:
the symbol that has been encoded into the received data signal is a 64 QAM symbol;
the first piece-wise linear metric function is a monotonically increasing, odd function that includes seven segments such that each of the seven segments has one of four possible slope values; and
the second piece-wise linear metric function is an even function that includes four segments such that each of the four segments has one of two possible slopes values.

13. The apparatus of claim 9, wherein:
the I convolutional decoder and the Q convolutional decoder are implemented within a convolutional decoder that is operable to combine the best estimate of the at least a first bit of the symbol and the best estimate of the at least a second bit of the symbol thereby generating a best estimate of the symbol.

14. The apparatus of claim 9, further comprising a plurality of antennae that is configured in a spatially diversified manner; and wherein:
the apparatus is a wireless modem indoor unit;
each antenna within the plurality of antennae provides an antenna signal to the wireless modem indoor unit; and
the wireless modem indoor unit combines each of the antenna signals into the input voltage.

15. A method, comprising:
receiving a data signal that has been generated using multi-bit per symbol encoding and forward error correction encoding;
extracting an I-rail voltage (In-phase voltage) and a Q-rail voltage (Quadrature-phase voltage) from an input voltage signal;
processing the I-rail voltage to approximate a first optimal decision metric using a first piece-wise linear metric function;
processing the I-rail voltage to approximate a second optimal decision metric using a second piece-wise linear metric function;
processing the Q-rail voltage to approximate a third optimal decision metric using the first piece-wise linear metric function;
processing the Q-rail voltage to approximate a fourth optimal decision metric using the second piece-wise linear metric function;
performing convolutional decoding processing using the first optimal decision metric and the second optimal decision metric thereby generating a best estimate of at least a first bit of a symbol that has been encoded into a received data signal; and
performing convolutional decoding processing using the third optimal decision metric and the fourth optimal decision metric thereby generating a best estimate of at least a second bit of the symbol that has been encoded into the received data signal.

16. The method of claim 15, wherein the received data signal is received by a communication receiver, the communication receiver is a wireless modem indoor unit.

17. The method of claim 15, wherein the first optimal decision metric is a distance metric.

18. The method of claim 15, wherein:
the approximating of the optimal decision metric further comprises:
the approximating the first optimal decision metric is performed using an I-rail engine; and
the approximating the third an optimal decision metric is performed using a Q-rail engine.

19. The method of claim 15, further comprising combining the best estimate of the at least a first bit of the symbol and the best estimate of the at least a second bit of the symbol thereby generating a best estimate of the symbol.

20. The method of claim 15, wherein the received data signal is a vector orthogonal frequency division multiplexing (VOFDM) signal.

21. The method of claim 15, wherein the receiving of the data signal further comprises receiving the data signal using a plurality of antennae that is configured in a spatially diversified manner; and
wherein each antenna within the plurality of antennae provides an antenna signal; and
further comprising combining each of the antenna signals into a single signal before approximating the optimal decision metric.

22. The method of claim 15, wherein the data signal is encoded using at least one of a QPSK coding scheme, a 16 QAM coding scheme, a 64 QAM coding scheme, a 256 QAM coding scheme, and a 1024 QAM coding scheme.

23. A method, comprising:
receiving and splitting an input voltage into an I-rail voltage and a Q-rail voltage using symbol demodulation;
generating a soft-decision metric for a most significant I-rail bit of the I-rail voltage using a first piece-wise linear metric function;
generating a soft-decision metric for a least significant I-rail bit of the I-rail voltage using a second piece-wise linear metric function;
generating a soft-decision metric for a most significant Q-rail bit of the Q-rail voltage using the first piece-wise linear metric function;
generating a soft-decision metric for a least significant Q-rail bit of the Q-rail voltage using the second piece-wise linear metric function;
performing convolutional decoding processing using the soft-decision metric for the most significant I-rail bit and the soft-decision metric for the least significant I-rail bit thereby generating a best estimate of at least a first bit of a symbol that has been encoded into a received vector orthogonal frequency division multiplexing (VOFDM) signal; and
performing convolutional decoding processing using the soft-decision metric for the most significant Q-rail bit and the soft-decision metric for the least significant Q-rail bit thereby generating a best estimate of at least a second bit of the symbol that has been encoded into the received VOFDM signal.

24. The method of claim 23, wherein the method is performed within a wireless modem.

25. The method of claim 23, wherein the received VOFDM signal is encoded using at least one of a QPSK coding scheme, a 16 QAM coding scheme, a 64 QAM coding scheme, a 256 QAM coding scheme, and a 1024 QAM coding scheme.

26. The method of claim 23, further comprising:
encoding an input signal using an encoder; and
transmitting the encoded input signal from the encoder to a decoder via a communication channel; and
wherein the method is performed within the decoder;
the encoding comprises performing multi-bit per symbol encoding on the input signal;
the encoding also comprises employing forward error correction when encoding the input signal.

27. The method of claim 23, wherein the optimal decision metric approximation method is operable to perform decoding of the input voltage when the input voltage is encoded using vector orthogonal frequency division multiplexing.

28. The method of claim 23, further comprising receiving the encoded, transmitted input signal using a plurality of antennae that is configured in a spatially diversified manner, each antenna within the plurality of antennae provides an antenna signal; and
combining each of the antenna signals into a single signal that comprises the input voltage.

* * * * *